UNITED STATES PATENT OFFICE.

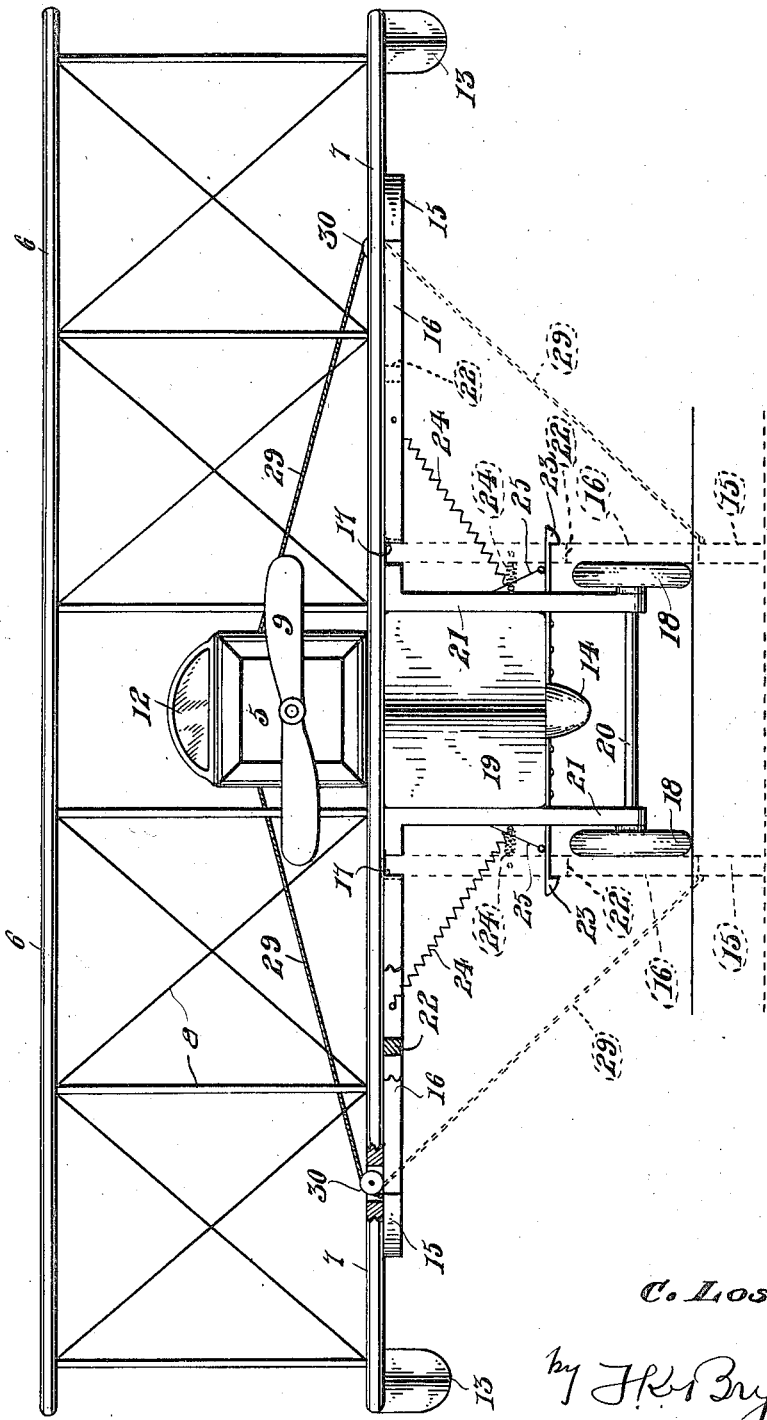

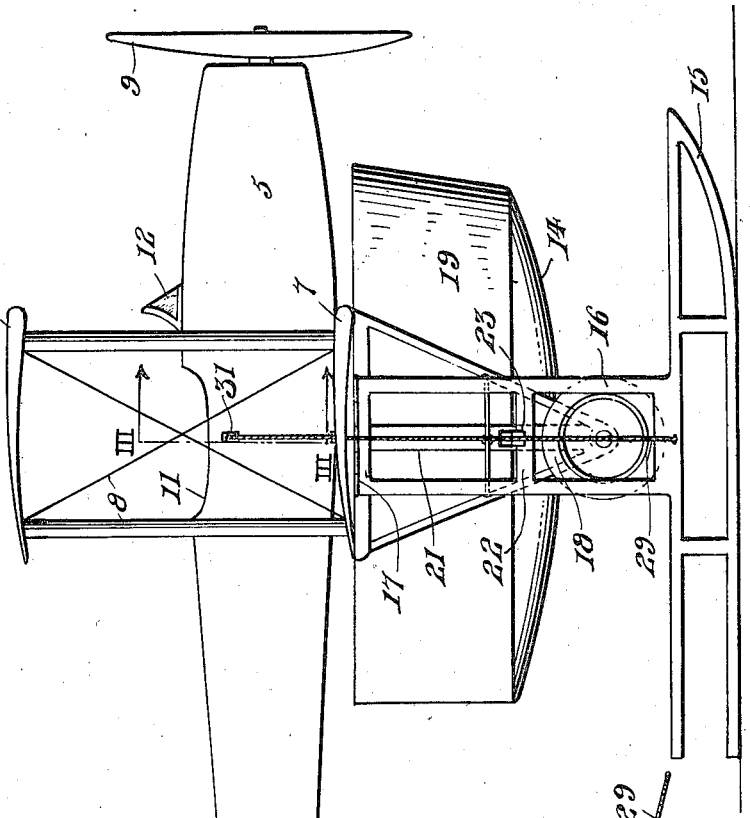
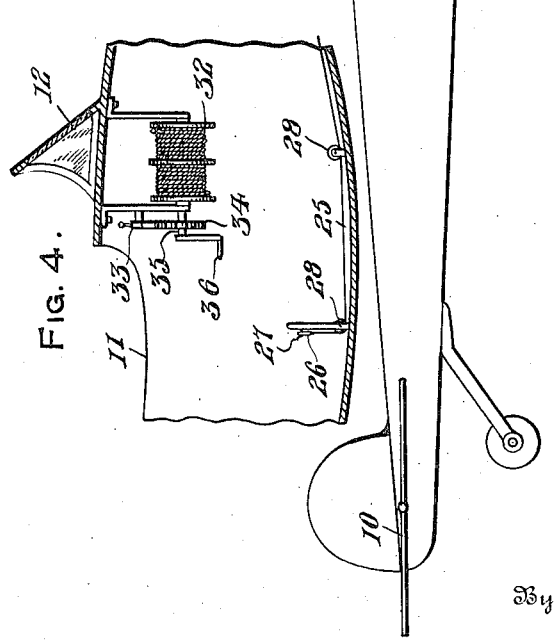
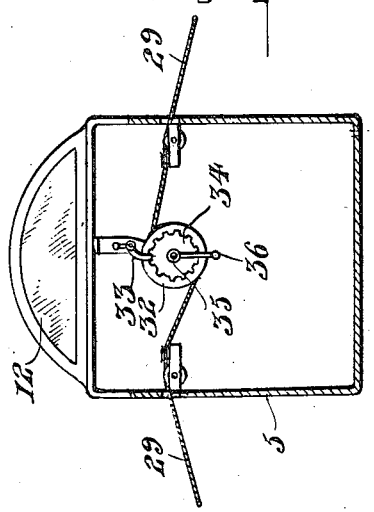

CONRAD LOSKI, OF MILLER RUN, PENNSYLVANIA.

AEROPLANE.

1,418,943.  Specification of Letters Patent.  Patented June 6, 1922.

Application filed June 20, 1921. Serial No. 479,048.

*To all whom it may concern:*

Be it known that I, CONRAD LOSKI, a citizen of Austria, residing at Miller Run, in the county of Somerset and State of Pennsylvania, have invented certain new and useful Improvements in Aeroplanes, of which the following is a specification.

This invention relates to certain new and useful improvements in aeroplanes and has particular reference to the provision of an aircraft which may be normally employed for travel upon land or water, as well as in the air, and provided with normally operative runners for permitting use of the device upon ice or snow, means being provided for readily retracting the runners to an inoperative position when not required for use.

An important object of the invention is to provide means for moving runners provided on an aeroplane, from an operative to an inoperative position at will, and controllable by the driver from a point within the fuselage.

Another object of the invention is to provide an aeroplane of the bi-plane type with runners pivotally adapted for vertical swinging movement to the undersides of the lower planes so that the same may be moved from a horizontal inoperative position flatly contacting the under surfaces of said lower planes, to a vertical operative position at opposite sides of the fuselage.

Another object of the invention is to provide a simple and efficient means for swinging the pivoted runners and for maintaining the same in either operative or inoperative position.

With these general objects in view and others that will appear as the nature of the invention is better understood, the same consists in the novel construction, combination and arrangement of parts hereinafter more fully described, illustrated in the accompanying drawings, and pointed out in the appended claims.

In the drawings forming a part of this application, and in which like designating characters refer to corresponding parts throughout the several views, Figure 1 is a front elevational view of an aircraft constructed in accordance with the present invention with parts in transverse section, and with the runners indicated in operative position by dotted lines, Figure 2 is a side elevational view of the device shown in Figure 1, with the auxiliary pontoons removed, and with the runners operatively disposed, Figure 3 is an enlarged transverse sectional view taken substantially upon line III—III of Figure 2, and with parts removed and Figure 4 is an enlarged fragmentary longitudinal sectional view of the fuselage showing the controlling mechanism for the runners.

Referring more in detail to the several views, the present invention embodies a fuselage 5 having the usual upper and lower planes 6 and 7 respectively, extending laterally from opposite sides thereof and suitably interconnected and braced as at 8, a propeller 9 being provided at the forward end of the fuselage adapted to be connected with an engine in the usual or any preferred manner for propelling the craft, the empennage being provided as at 10 at the rear end of the fuselage and an entrance opening being provided as at 11 for the admission and exit of the operator beneath the upper planes 6. If desired, a suitable windshield 12 may be provided upon the fuselage, and pontoons 13 are provided upon the outer ends of the lower planes 7, so as to act as auxiliary floats when the craft is employed as a hydroplane, a main pontoon or float being provided as at 14 longitudinally beneath the fuselage 5 in a well known manner.

The present invention lies mainly in the provision of runners 15 for the aircraft whereby the latter may be conveniently run upon ice or snow when desired. These runners are rigid with central runner frames 16 which have their free end portions pivotally attached as at 17 to the undersides of the lower planes 7 at opposite sides of the fuselage 5 whereby said runners and frames may be swung vertically, so as to lie flatly against the under surfaces of the planes 7 when not required for use or so that the same may be swung downwardly to a vertical position as shown in Figure 1 by dotted lines and by full lines in Figure 2 when required for use. When the runners are vertically disposed the same project below the ground-engaging wheels 18 which are suitably mounted beneath the lower planes 7 in any usual or preferred manner and is well understood in the art and it will be apparent that when the runners are horizontally disposed, they will be entirely out of the way and offer little resistance to the forward travel of the machine. The main pontoon 14 carried by the hull-like body 19 fixed to the under sides of the lower planes 7 directly beneath the fuselage 5, and the supporting wheels 18 are preferably mounted upon a transverse axle 20 journaled in the lower ends of a pair of uprights 21 suitably fixed to the sides of the body 19 and to the under surfaces of the lower planes 7, as shown in Figure 1.

The runner frames 16 are preferably composed of a pair of longitudinal parallel bars connected by a substantially central transverse bar 22, and a catch 23 is fixed to the bottom of the body 19, adjacent each upright 21 with its hooked end arranged to snap over the transverse bar 22 of the adjacent runner frame when the latter is vertically disposed for maintaining said runners in operative position, further swinging movement of the runners toward each other being prevented by the upper ends of the uprights 21 and the supporting wheels 18. Springs 24 are connected between the frames 16 and the uprights 21 for normally swinging the runners to their operative positions with sufficient force to automatically snap the bars 22 behind the catches 23, and in order to release the catches 23, suitable flexible members 25 are connected to said catches, and extend upwardly into the fuselage 5 within convenient reach of the operator so that the same may be readily pulled for upwardly flexing said catches and thereby elevating the hooked ends of the same out of the path of the bars 22. The ends of the flexible members 25 within the fuselage 5 may be connected to a swinging ring 26 arranged to engage a hook 27 suitably fixed within the fuselage where the said ring may be conveniently reached whenever desired, and by means of which a single pull upon the ring 26 will release both catches. The flexible members 25 are passed through suitable guides 28 for reducing friction.

In order to raise the runners to an inoperative position against the action of the springs 24, after the catches 23 have been released, further flexible members 29 are attached to said runners and extended upwardly and around suitable guides 30 journaled in openings provided in the lower planes 7 from which said flexible members 29 pass inwardly over suitable guides provided as at 31 in openings formed through the sides of the fuselage 5 forwardly of the entrance and exit opening 11. The ends of the flexible members 29 within the fuselage are attached to a suitable winding drum 32 which is suitably journaled within the fuselage between the guides 31, in such manner that when the drum 32 is rotated in one direction both of the flexible members 29 are simultaneously wound upon said drum for swinging the runners to a horizontal position and when said runners are in contact with the under surfaces of the lower planes 7, they will be so held by means of a latch 33 engaging the teeth of a gear 34 which is fixed upon the shaft 35 of the drum 32. A handle 36 is provided upon the shaft 35 for rotating the drum 32, and it will be seen that when the latch 33 is released, the drum 32 may be freely rotated by the springs 24 for paying out the flexible members 29 and swinging the runners to an operative position.

In operation the runners will be disposed as shown in Figure 1 engaging the under surfaces of the planes 7 and if it is desired to run upon ice or snow, the latch 33 is released and the springs 24 immediately swing the runners to a vertical position within the catches 23 engaging the bars 22 and rigidly maintain the runners in an operative position. When the runners are no longer required, the ring 26 is removed from the hook 27 and a pull exerted thereon for simultaneously pulling both flexible members 25 so as to release the catches 23.

While the catches are maintained disengaged from the bars 22, the handle 36 is operated for rotating the drum 32 so as to wind the flexible members 29 thereon until the runners move into contact with the planes 7 and the latch 33 will automatically engage the gear 34 for preventing backward operation of the drum 32 and consequently for preventing unwinding of the flexible members 29 or downward swinging of the runners.

While the form of the invention herein shown and described is what is believed to be the preferred embodiment thereof, it is nevertheless to be understood that various forms, modifications and arrangements of the parts may be made without departing from the spirit and scope of the invention as claimed.

What I claim as new is:—

1. In combination with an aeroplane having ground-engaging wheels and a fuselage, a pair of runners movable to an operative position below the ground-engaging wheels and to an inoperative position above said wheels, of means controllable from a point within the fuselage for causing movement of said runners from operative to inoperative position or vice versa at will, means to automatically retain the runners in an operative position, means operable from within the fuselage for releasing said retaining means, said runners being pivotally mounted for lateral swinging movement in a vertical direction to move from one position to the other, and means to normally automatically swing said runners to their vertical operative positions, said retaining means comprising resilient catches.

2. In combination with an aeroplane having a fuselage and a pair of oppositely extending planes, of a pair of runners pivoted to the under sides of said planes in spaced relation for vertical swinging movement against the under sides of said planes and to a vertical position depending from said planes, the said runners integrally carrying vertical frame posts with a cross bar between the posts intermediate their ends, means to swing said runners to a horizontal position, means to swing said runners to a vertical position, and means engageable with the cross bar of said frame post for rigidly maintaining said runners in their vertical operative positions.

3. In combination with an aeroplane having a fuselage and a pair of oppositely extending planes, of a pair of runners pivoted to the under sides of said planes in spaced relation for vertical swinging movement against the under sides of said planes and to a vertical position depending from said planes, the said runners integrally carrying vertical frame posts with a cross bar between the posts intermediate their ends, means to swing said runners to a horizontal position, means to swing said runners to a vertical position, means engageable with the cross bar of said frame post for rigidly maintaining said runners in their vertical operative positions, and means within the fuselage for releasing said retaining means.

In testimony whereof I affix my signature.

CONRAD LOSKI.